3,482,398
HYDROSTATIC STEERING SYSTEM
Helge K. Christensen, Svenstrup, Als, Denmark, assignor to Danfoss A/S, Nordborg, Denmark, a company of Denmark
Filed Jan. 17, 1968, Ser. No. 698,508
Claims priority, application Germany, Jan. 27, 1967, D 52,117
Int. Cl. F15b 11/16, 13/06
U.S. Cl. 60—52                                        4 Claims

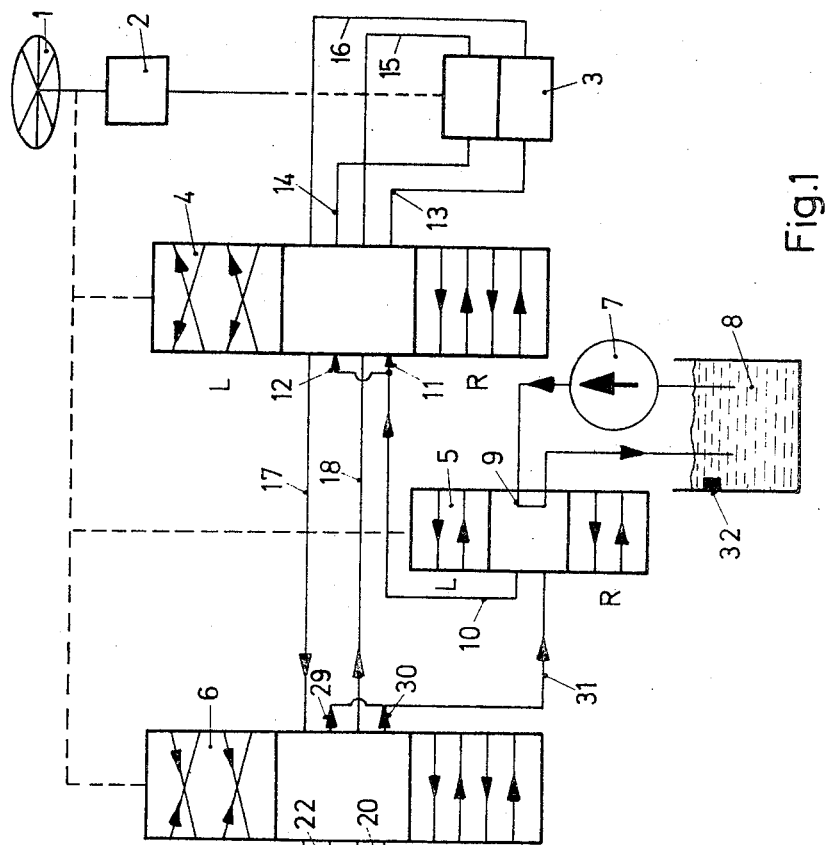
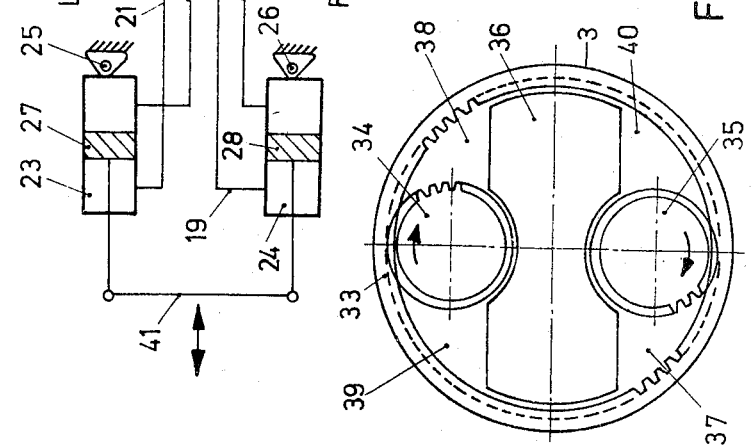

ABSTRACT OF THE DISCLOSURE

The invention relates to a hydrostatic steering system of the type having hoses instead of a mechanical connection between the steering wheel and the wheels to be steered.

The steering system represents a known combination of functional components which comprises a piston and cylinder arrangement for operating a mechanical linkage connected to the wheels to be steered, a steering wheel, a metering pump device actuated by the steering wheel, and a valve device actuated by the metering pump device to effect the supplying an exhausting of fluid to and from the piston and cylinder arrangement.

The invention is directed to the providing of a unique modification and improvement of the known system wherein certain of the components have dual characteristics so that the failure of one critical part such as a hose does not result in inoperativeness.

In effect, a dual hydraulic steering system is provided in which two generally independent sets of hydraulic paths are utilized to achieve a safe, practically accident proof system at only a relatively small, additional cost.

---

This invention relates to a hydrostatic steering system in which a cylinder system of a steering means acting upon the wheels to be steered is supplied with fluid under pressure, the steering wheel directly ore indirectly displacing a metering device (pump or motor), fitted on the pressure side, and a valve having two effective positions for changing over the pipes leading to the operating cylinder.

Hydrostatic steering systems of this kind make it possible to dispense with a mechanical connection between the steering means and the wheels to be steered. It suffices to provide hydraulic pipes between the steering means and the cylinder system.

The known steering systems possess one operating cylinder. When one of the pipes leading to it becomes unsound, the vehicle can no longer be steered. The known hydrostatic steering systems are therefore suitable only for slow-moving vehicles, which can be brought immediately to a stop upon such failure of the steering system.

The object of the present invention is to provide a hydrostatic steering system which does not become inoperative upon the occurrence of a fracture in a pipe and which is therefore also suitable for more rapidly moving vehicles.

According to the invention, this object is achieved by means of two operating cylinders the pistons of which are mechanically connected to each other and through each of which a metering device is supplied with fluid under pressure, both metering devices being adjustable in dependence upon the same steering movement.

In normal operation, this arrangement functions in the same way as the known steering system, since the two metering devices operate in synchronism. Upon the occurrence of a fracture in a pipe, however, one operating cylinder remains fully effective so that it is still possible to continue to steer the vehicle in a safe manner and to drive it onto the side of the road or even to the nearest repair workshop.

The additional expense necessary for ensuring the required safety can be kept small. Whilst, in the extreme case, two systems of normal design can be combined in such manner that a common steering wheel controls both metering devices, it is possible to operate, without difficulty, with a common pump (and a common tank, for the fluid) for both metering devices and operating cylinders. A circuit of this kind is possible because the two metering devices act as a blocking member which prevents the drop in pressure in the region of the broken pipe from affecting the other cylinder system. Furthermore, it suffices to use cylinders which are only half as big as those previously used, since, in the normal case, these cylinders act jointly on the steering rod system, whereas a smaller cylinder also suffices for emergency control purposes. Furthermore, it is expedient to equip the valve for changing over the supply pipes for the two cylinders with a common movable valve member, e.g. a rotary slide.

Other components of the two cylinder systems can also be combined with each other.

It is particularly advantageous to use a known pump as the metering device, wherein at least one pair of toothed wheels, separated from each other by a partitioning element, are fitted in a toothed ring, and the toothed ring and the toothed wheels and partitioning element rotate relatively to each other. This pump can be connected up in such a way that two metering devices are obtained which are directly connected with each other mechanically and occupy very little space.

Then, a fluid-level measuring instrument in the oil tank can serve as a warning device. Loss of oil exceeding the usual amount draws the driver's attention to a break in the piping.

Instead of this, it is also possible to fit a pressure-check device to the operating cylinders, which device indicates a break in the piping if the pressure drops below a given value.

The invention will now be described in more detail by reference to an embodiment illustrated in the drawing, wherein:

FIG. 1 shows a connection diagram for the steering system according to the invention, and FIG. 2 shows a double metering device which can be used in accordance with the invention.

A steering wheel 1 drives a double metering device 3 through a clutch 2, e.g. a lost-motion clutch. Three adjusting valves 4, 5 and 6 are actuated directly by the steering wheel 1 in such a manner that when the steering wheel is stationary they occupy the neutral position illustrated, and the position R when the steering wheel is turned to the right and the position L when it is turned to the left. The three valves can be mounted on a common rotary slide. A pump 7 passes oil under pressure from a sump 8. In the neutral position of the valves, this oil is returned to the sump 8 by way of a short-circuit pipe.

Running from valve 5 is a pipe 10, which divides into two branches 11 and 12 and leads to valve 4. The two branches are continued as pipes 13 and 14 running to the double metering device 3. Two pipes 15 and 16 are connected to the latter and lead back to the valve 4. From here, two pipes 17 and 18 lead to the valve 6. From this valve, two pairs of pipes 19, 20 and 21, 22 lead to two operating cylinders 23 and 24 which are mounted by means of hinge members 25 and 26 and the pistons 27 and 28 of which actuate a common steering rod system 41. Running from the valve 6 are two pipe branches 29 and 30 which join to form the pipe 31 leading back to the valve 5. The pipes 19–22 are normally in the form of hoses.

When the steering wheel is turned clockwise, the three valves 4–6 slide upwards. Oil under pressure is then passed through the pipe 10. It divides into the branch pipes 11, 13 and 12, 14, passes through each part of the metering device 3 and continues along the pipes 15, 18, 19 and 16, 17, 21 respectively into the cylinder cavities to the left of the pistons. Consequently, the steering rod system 41 moves to the right. The oil thereby displaced returns through the branch pipes 22, 29 and 20, 30 respectively and the return pipe 31 into the sump 8.

When the steering wheel is turned counterclockwise, converse conditions obtain. The oil passes through the pipes 15 and 16 into the double metering device 3 and enters the cylinder cavities to the right of the pistons 27 and 28, the steering rod system 41 being thereby displaced to the left.

If the hose 21, for example, breaks when the steering wheel 1 is turned clockwise, a drop in pressure occurs in the pipes of the associated system. The pressure drop on the discharge side of operating cylinder 23 is unobservable, but on the pressure side of cylinder 23 the effect of the pressure-drop can extend only into the pipes 17 and 16. The metering pump then by reason of its inherent design as a volumetric pump as described further on herein, serves as a blocking device which prevents the effect of the drop in pressure from going beyond the pump and reaching the system associated with the cylinder 24.

A liquid-level measuring device 32 is fitted in the sump 8. It gives a warning signal when the oil-level in the sump 8 drops below a given mark, since it is then necessary to take into account a possible break in the piping.

FIG. 2 illustrates a double metering device such as can be used in accordance with the invention. It consists of a toothed ring 33, which is driven to an extent depending upon the extent to which the steering wheel is turned. This ring meshes with two toothed wheels 34 and 35. A partitioning element 36 is disposed between the toothed wheels. Considering the indicated direction of rotation, two suction compartments 37 and 38 and two pressure compartments 39 and 40 are formed. These compartments exchange their function when the direction of rotation alters. Assuming that the directions of rotation indicated on the drawing correspond to a right-hand bend, the pipes 13 and 14 are connected with the compartments 38 and 37, and the pipes 15 and 16 with the compartments 39 and 40. If the pressure in compartment 40 drops as a result of a break in the piping, for instance, the effect of this cannot be felt in the compartment 39, since the toothed wheels, operating as a volumetric pump, do not permit any hydrostatic connection to be established.

Numerous other constructions can be used for the double metering device. It is not necessary to provide a mechanical connection between the steering wheel and the metering device. The metering device can, for example, be a servo-motor, which only comes to a stop when a back-drive rotary slide, coupled therewith, is followed in an appropriate manner by a forward-drive rotary slide coupled with the steering wheel, as disclosed for example in U.S. Patent No. 2,984,215.

I claim:

1. A hydrostatic steering system of the type having piston and cylinder means adapted to be attached to the steering linkage of a vehicle, valve means having two effective positions for operating said piston and cylinder means to effect the movement of said linkage in opposite directions to facilitate left and right turns, metering means adapted to be attached to and controlled by a steering wheel, said metering means being operable to supply pressurized fluid to said valve means in response to movements of said steering wheel, and pump means for supplying pressurized fluid to said metering means, said steering system being characterized by said piston and cylinder means comprising a pair of cylinders having a pair of pistons disposed respectively therein, said pistons being mechanically connected, said metering means and said valve means having dual passages to facilitate the supply and exhausting of fluid to and from each of said cylinders independently of the other said cylinder.

2. A hydrostatic steering system according to claim 1 wherein said pump means is a single pump.

3. A hydrostatic steering system according to claim 1 wherein said metering means comprises a gear pump having a pair of gears engaging a ring gear, a partition separating said pair of gears from each other and forming dual pressure and exhaust chambers on opposite sides of said partition, said pair of gears and said ring gear being rotatable relative to each other.

4. A hydrostatic steering system according to claim 1 including a sump and a liquid level measuring instrument in said sump for indicating the level of the liquid therein.

References Cited

UNITED STATES PATENTS

| | | | |
|---|---|---|---|
| 2,634,582 | 4/1953 | Klatte et al. | 60—53 |
| 3,095,783 | 7/1963 | Flindt | 91—1 |
| 3,170,536 | 2/1965 | Van House et al. | 60—52 XR |
| 3,320,745 | 5/1967 | Bahniuk et al. | 60—52 XR |
| 3,411,410 | 11/1968 | Westbury et al. | 91—411 XR |

EDGAR W. GEOGHEGAN, Primary Examiner

U.S. Cl. X.R.

91—1, 411; 180—79.2